United States Patent
Sartain et al.

(10) Patent No.: US 6,622,926 B1
(45) Date of Patent: Sep. 23, 2003

(54) THERMOSTAT WITH AIR CONDITIONING LOAD MANAGEMENT FEATURE

(75) Inventors: John M. Sartain, St. Louis, MO (US); Bartholomew L. Toth, St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 40 days.

(21) Appl. No.: 10/065,427

(22) Filed: Oct. 16, 2002

(51) Int. Cl.[7] .......................... G05D 23/00; F24F 11/00
(52) U.S. Cl. ...................... 236/46 R; 62/231; 236/78 D
(58) Field of Search ................................ 236/46 R, 47, 236/78 D; 62/231

(56) References Cited

U.S. PATENT DOCUMENTS

| | | | |
|---|---|---|---|
| 3,917,165 A | * 11/1975 | Cross | 236/47 X |
| 4,089,462 A | 5/1978 | Bradford | 236/68 |
| 4,289,272 A | 9/1981 | Murase et al. | 236/91 |
| 4,753,388 A | * 6/1988 | Rummage | 236/46 R |
| 5,293,755 A | 3/1994 | Thomas | 62/208 |
| 5,415,346 A | * 5/1995 | Bishop | 236/78 D |
| 5,524,444 A | * 6/1996 | Gromala et al. | 236/78 D X |
| 6,260,765 B1 | 7/2001 | Natale et al. | 236/47 |

* cited by examiner

Primary Examiner—William Wayner
(74) Attorney, Agent, or Firm—Kevin Pumm

(57) ABSTRACT

A thermostat comprising a software sub-routine for controlling the operation of an air conditioner and a stored value representative of the air conditioner's operating and non-operating time, which is indicative of the outdoor temperature and load on the air conditioning system. The stored value representative of operating time is evaluated by the software sub-routine, which responsively raises the set-point temperature when the stored value exceeds a predetermined level indicative of a high outdoor temperature. The economy feature can be manually enabled, or remotely enabled via an input signal from a phone or Internet connection.

8 Claims, 1 Drawing Sheet

THERMOSTAT WITH AIR CONDITIONING LOAD MANAGEMENT FEATURE

BACKGROUND OF INVENTION

Most air conditioning systems require a control system for controlling the air conditioning load, especially during peak outdoor temperature periods. A thermostat provides a control means for controlling an air conditioning system to maintain a temperature in an indoor space that is comfortable for the occupants. Energy considerations become important when the outside temperature substantially exceeds an indoor temperature set point. Most thermostat controls permit the user to set a desired set point temperature above which the air conditioner will energize to cool the space. However, when the outdoor temperature greatly exceeds the indoor temperature set point, a substantial energy load is required to maintain the indoor temperature. As a result, energy is wasted since the air conditioner maintains an indoor temperature that is lower than necessary to keep the occupants comfortable relative to the peak outdoor temperatures during the summer.

Prior control systems have attempted to control the indoor temperature based upon the outdoor temperature. U.S. Pat. No. 4,289,272 discloses a temperature control apparatus that operates by calculating a desired indoor temperature using a linear function of outdoor temperature. U.S. Pat. No. 4,089,462 discloses a temperature control system for shifting the indoor temperature set point with respect to outdoor temperature. U.S. Pat. No. 5,293,755 interrupts operation of an air conditioner when an allowable difference between indoor and outdoor temperatures is exceeded. While the control systems described in the above references provide means for air conditioning load reduction during peak periods, the above systems all require the installation and use of an outdoor sensor to measure the outdoor temperature.

It would be desirable, therefore, to provide a more simple control means for reducing the load of an air conditioning system during peak daytime temperature periods, which does not require the cost associated with the use or installation of an outside temperature sensor.

SUMMARY OF INVENTION

The present invention provides for a digital thermostat that comprises a software sub-routine for controlling the operation of an air conditioner and a stored value representative of the air conditioner's operating time, which is indicative of the outdoor temperature and load on the air conditioning system. When the outdoor temperature greatly exceeds the indoor temperature set point, the load on the air conditioner increases, i.e., the air conditioner is on for greater periods of time and off for shorter periods of time. The stored value representative of operating time is evaluated by the software sub-routine, which responsively raises the set-point temperature when the stored value exceeds a predetermined level indicative of a high outdoor temperature. The raised set point results in a reduced load (on-time) for the air conditioner.

It is a further object of the invention to provide a digital thermostat that comprises a selectable "economy" mode of operation for enabling the above-described means for reducing the load on the air conditioning system. The user may select or deselect the economy mode as desired to suit the individual economic and comfort preferences of the user. The economy mode can be manually selected by the user, or remotely selected by the user or an Electric Power Utility provider to reduce energy consumption. An Electric Utility company may remotely access the thermostat via phone or Internet connection to select the economy mode as a way of shedding energy load demands during peak power usage periods.

DETAILED DESCRIPTION

Figure 1:
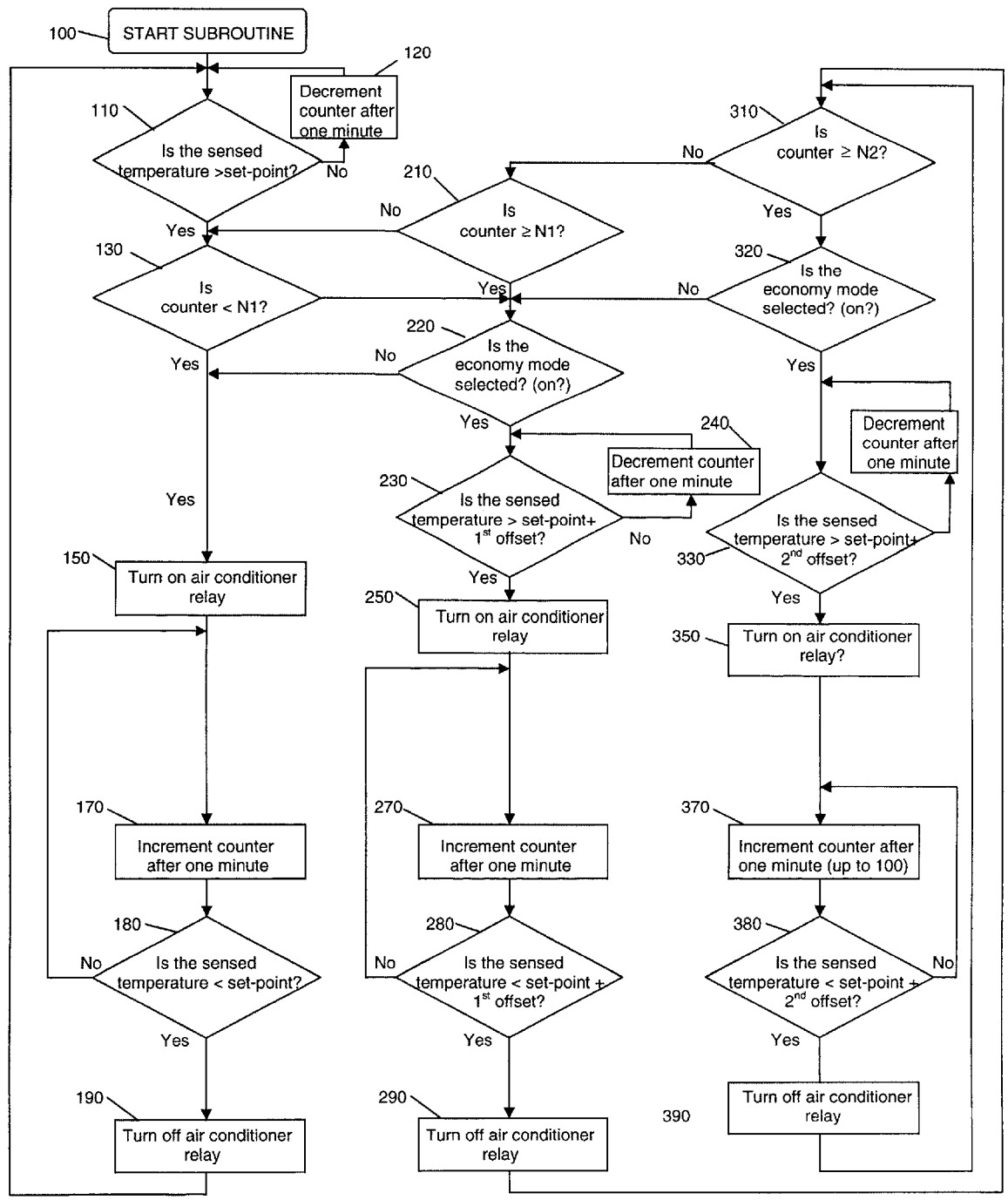
FIG. 1 is a flow chart diagram of the software sub-routine relating to the economy mode incorporated into the digital thermostat in accordance with the present invention.

A software sub-routine comprising an economy mode according to the principles of the present invention is subsequently described in connection with a digital thermostat control, though it is not so limited, and can be implemented in connection with other types of HVAC control systems. The digital thermostat control comprises a software program in the thermostat's microprocessor for controlling an HVAC system and processing various user selected inputs such as set point temperatures and times. As thermostat software programs for controlling a thermostat's operation and temperature settings are prevalently used and well known in the art, the software program as a whole will not be described in detail. The function of the sub-routine comprising the economy mode feature essential to the invention will be described in detail in the flow chart shown in FIG. 1.

When the digital thermostat is operating in the cool mode, the software sub-routine is initiated at step 100 in FIG. 1 to control the energizing of the air conditioner in response to the sensed temperature in the space. At step 110, the last sensed temperature stored in the microprocessor's memory is compared to the present set point temperature of the thermostat. If the sensed temperature is not greater than the set point temperature, the sub-routine at step 120 decrements the last stored counter value representing the operating time of the air conditioner and returns to step 100. The counter value is preferably an integer representing both the time of operation and non-operation in minutes, from a maximum value of 120 to a minimum value of 1 (the initial default counter value). If the sensed temperature is greater than the set point temperature, the sub-routine proceeds to step 130 to compare the last stored counter value to a predetermined number, N1, indicative of a high outdoor temperature. The number N1 represents a time period greater than the maximum time duration a properly sized air conditioner should run to cool a space, which in the present invention is preferably a value of 60. If at step 130 the stored counter value is less than N1, the air conditioner is presumed to be cooling the space under moderate outdoor temperature conditions. The air conditioner is then energized at step 150 to begin operation at the normal set point temperature. The counter value will increment by one at step 170 for each minute the sensed temperature at step 180 is not less than the normal set point temperature. If at step 180 the sensed temperature is less than the set point temperature, the air conditioner is turned off at step 190.

If at step 130 the stored counter value is not less than N1, indicating the air conditioner has been running longer as a result of high outside temperatures, the sub-routine checks whether the economy mode is selected at step 220. If the economy mode is not selected, the sub-routine proceeds to energize the air conditioner at step 150 to achieve the normal set-point temperature as previously described. If the economy mode is selected, the sub-routine proceeds to energize the air conditioner at step 250 to achieve a first "economical" set point temperature. The first economical set point is preferably the present set point temperature plus an offset of three degrees Fahrenheit. The counter value will increment by one at step 270 for each minute the sensed temperature at step 280 is not less than the first economical set point temperature. If the sensed temperature at step 280 is less than the first economical set point, the air conditioner is turned off at step 290.

If at step 310, the counter value is not less than N2, indicating the air conditioner has been running much longer as a result of very high outside temperatures, the sub-routine proceeds toward step 330 to achieve a second economical set point temperature. The number N2 in the present invention represents almost continuous air conditioner operation, and is preferably a value of 95. The second economical set point is preferably the present set point temperature plus an offset of five degrees Fahrenheit. If the sensed temperature is greater than the second economy set point temperature at step 330, the air conditioner is turned on at step 350. The counter value will increment by one at step 370 for each minute the sensed temperature at step 380 is not less than the second economical set point temperature. If at step 380 the sensed temperature is less than the second economical point temperature, the air conditioner is turned off at step 390.

The operation of a control system embodying the present invention, during a peak outdoor temperature period, is illustrated in the following example. The indoor set point temperature is 72 degrees Fahrenheit, and the sensed temperature in the space is found to be 73 degrees Fahrenheit. The stored counter value is at 45, and the economy mode is not selected. Since the sensed temperature is greater than the set point temperature and the counter value is less than N1, the air conditioner is turned on at step 150. The air conditioner runs for 40 minutes before the sensed temperature at step 180 reaches 71 degrees and the air conditioner turns off at step 190. The counter value has incremented up to 85. The air conditioner ran for 40 minutes, and remains off for 10 minutes to yield a 4 to 1 load ratio.

During the 10 minute off time, the economy mode was selected. Also during the 10 minute off time, the counter value decremented to 75 and the sensed temperature increased to 73 degrees. Since the sensed temperature of 73 degrees is greater than the set point temperature, and the counter value of 75 is not less than N1, the sub-routine checks the economy mode at step 220. With the economy mode selected, the sub-routine proceeds to step 230. The sensed temperature of 73 degrees is less than the first economy set point temperature (72 degrees plus 3 degrees), so the air conditioner is not turned on at step 250. The air conditioner remains off for 15 minutes, during which time the counter value at step 240 decremented to 60, and the sensed temperature increased to 76 degrees. Since the sensed temperature of 76 degrees (at step 230) is greater than the first economy set point temperature (72 degrees plus 3 degrees), the air conditioner is turned on at step 250. The air conditioner runs for 30 minutes before the sensed temperature at step 280 reaches 74 degrees and the air conditioner turns off at step 290. During the 30 minutes, the counter value incremented up to 90. The air conditioner ran for 30 minutes, and subsequently remained off for 10 minutes to yield a 3 to 1 load ratio.

During the 10 minute off period, the counter value decremented to 80 and the sensed temperature increased to 76 degrees. Since the counter value is less than N1, and economy mode is still selected, the sensed temperature is checked at step 230. Since the sensed temperature of 76 degrees is greater than the first economy set point temperature (72 degrees plus 3 degrees), the air conditioner is turned on at step 250. The air conditioner runs for 30 minutes before the sensed temperature at step 280 reaches 74 degrees and the air conditioner turns off at step 290. The counter value has incremented up to the maximum value of 120.

At step 310, the counter value of 120 is greater than N2, and the economy mode is still selected, so the sensed temperature is now checked at step 330. At step 330 the 74 degree sensed temperature is less than the second economy set point temperature (72 degrees plus 5 degrees), so the air conditioner is not turned on at step 350. The air conditioner remains off for 20 minutes, during which time the counter value decremented to 100, and the sensed temperature increased to 78 degrees. At step 330, the 78 degree sensed temperature is greater than the second economy set point temperature (72 degrees plus 5 degrees), so the air conditioner is turned on at step 350. The air conditioner runs for 20 minutes before the sensed temperature at step 380 reaches 76 degrees and the air conditioner turns off at step 390. The counter value has incremented up to the maximum value of 120. The air conditioner ran for 20 minutes, and subsequently remained off for 10 minutes to yield a 2 to 1 load ratio.

When the peak outdoor temperature decreases, the air conditioner off will remain off for longer time periods, which would allow the counter value to decrement down to the normal set point temperature operating mode beginning at step 130. The described economy mode feature therefore can reduce the load (on-time) of an air conditioning system without using an outside temperature sensor. In a five hour time period during peak outdoor temperatures, the above example would reduce 240 minutes of on time and 60 minutes of off time (4 to 1 ratio) to 200 minutes of on time and 100 minutes of off time (2 to 1 ratio). The above described economy mode feature may also be remotely selected or enabled via phone or internet access means, by the user or a power utility provider. Such an on/off input may be received through a modem connection and input to an interrupt pin to the microprocessor of the control system. Thus, the above control system comprising an economy mode function can be selected manually or remotely, to provide for effectively reduce the load of an air conditioning system during peak outdoor temperature periods.

It should be noted that the values and times in the above embodiment are exemplary, and may be modified to accommodate various indoor space conditions. While the above example is useful in describing the principles of the present invention, it should not be limited in scope to the embodiment described above. Those skilled in the art will recognize that the inventive digital thermostat of this invention may be useful in many other applications. Inasmuch as many modifications within the spirit of the invention will be apparent to those skilled in the art, the scope of the invention should be determined by reference to the claims appended below and the full scope of equivalents as provided by applicable laws.

What is claimed is:

1. A control system for controlling the operation of an air conditioning system comprising:

a set point temperature for controlling the energizing or de-energizing of the air conditioning system;

a stored value representative of the cumulative operating time of the air conditioning system less the cumulative non-operating time of the air conditioning system; and a control means for evaluating the stored value and responsively increasing the set point temperature by a first amount when the stored value exceeds a first predetermined amount, and increasing the set point temperature by a second amount when the stored value exceeds a second predetermined amount.

2. The control system according to claim 1, wherein the control means responsively increases the set point temperature independent of a sensed outdoor temperature.

3. The thermostat according to claim 2, wherein the control means comprises a microprocessor having a software program for controlling the operation of the air conditioning system.

4. A control system for selectively reducing the operation of an air conditioning system comprising:

- a set point temperature for controlling the energizing or de-energizing of the air conditioning system;
- a stored value representative of the operating time of the air conditioning system less the non-operating time of the air conditioning system;
- a selectable mode having an on or off position; and
- a control means for evaluating the stored value and responsively increasing the set point temperature by a first amount when the stored value exceeds a first predetermined amount, and increasing the set point temperature by a second amount when the stored value exceeds a second predetermined amount, only when the selectable mode is in an on position.

5. The control system according to claim 4, wherein the control means responsively alters the set point temperature independent of a sensed outdoor temperature.

6. The control system according to claim 4, wherein the control means comprises a microprocessor having a software program for controlling the operation of the air conditioning system.

7. The control system according to claim 6, wherein the selectable mode is selected to an on or off position by manually pressing an input device to the control system.

8. The control system according to claim 7, wherein the selectable mode is remotely selected to an on or off position by an external signal input to the microprocessor of the control system.

* * * * *